A. H. BASTIAN.
RAKER GAGE FOR CROSSCUT SAWS.
APPLICATION FILED JULY 17, 1917.

1,376,065.

Patented Apr. 26, 1921.

Inventor:
August H. Bastian
by
Atty.

UNITED STATES PATENT OFFICE.

AUGUST H. BASTIAN, OF HILLSDALE, OREGON.

RAKER-GAGE FOR CROSSCUT-SAWS.

1,376,065. Specification of Letters Patent. Patented Apr. 26, 1921.

Application filed July 17, 1917. Serial No. 181,157.

*To all whom it may concern:*

Be it known that I, AUGUST H. BASTIAN, a citizen of the United States, and a resident of Hillsdale, Multnomah county, State of Oregon, have invented a certain new and useful Improvement in Raker-Gages for Crosscut-Saws, of which the following is a specification.

The object of this invention is to provide an instrument for gaging and facilitating the proper shaping and finishing of the rakers of cross-cut saws. Also to adapt this instrument to infinite variations for said purpose. Also to provide means within the instrument for effecting its minute adjustment.

These objects, and incidental features, I attain by the device illustrated in the accompanying drawings, in which.

The frame or body piece, $a$, may be of the usual construction, and is provided with set or clamping screws $b$, $b'$ for clamping the file in place, in flat and edgewise positions.

Figure 2:
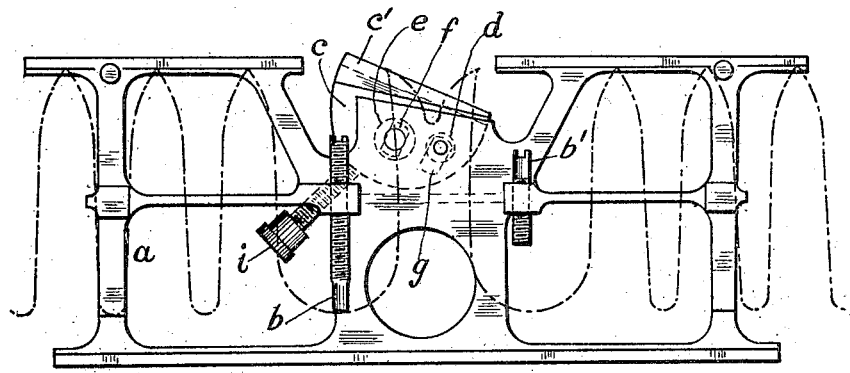
Fig. 2 is an elevation of the opposite side.
Figure 3:
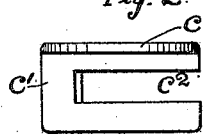
Fig. 3 is a bottom or inverted view of the "gage plate" of my device.
Figure 1:
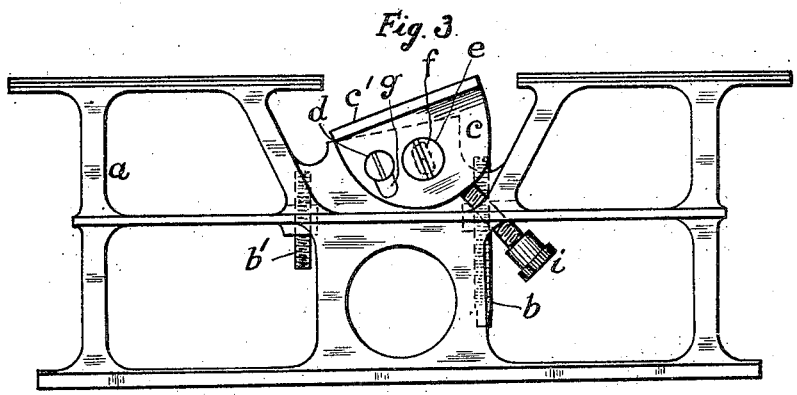
Figure 1 is an elevation of one side of my device.

On the frame or body piece, $a$, is supported a gage plate $c$, consisting of a body having an integral lateral flange $c'$, made with a slot $c^2$ to admit the raker, as illustrated in Fig. 2. The top or working face of the slotted flange of the gage-plate serves both to gage and to finish the rakers; the filer filing right down to the surface of this flange, which is case hardened.

The support of the gage-plate $c$ consists of two coöperating parts each permitting the gage plate relative, arcuate and lineal adjustment; for example, two set-screws $d$, $e$, extending through slots $f$, $g$ of the gage-plate and threaded into the body-piece $a$; the set screw $e$ being located at the approximate center of the gage plate, and the set screw $d$ to one side of this center and thus at one end of the gage plate. But I do not limit myself to any specific construction in this connection.

$i$ is a micrometer screw, in other words, a screw of very fine thread; such screw being journaled in the body piece $a$ and bearing against the gage plate $c$ to one side of its center, thus enabling one to give the gage-plate a very slight rotation about its center; and in so doing, facilitating the accurate gaging and finishing of the raker.

The manner of using my device is illustrated by the dotted outline of a section of a cross-cut saw shown in Fig. 2.

The set screws $d$ and $e$ being first released, the gage plate may then be rotated on the set screw $d$ by manipulating the micrometer screw $i$ until the top or working face of the flange $c'$ of the gage plate $c$ is placed in the desired plane, and the gage plate is then secured in place or adjusted by tightening said set screws.

I claim:

1. In a tool of the character described, a body-piece comprising two lateral edge portions spaced apart and connected by an intermediate web, a gage-plate pivotally mounted on such web and provided with a slot, a clamping screw for the gage-plate located at one side of the axis of rotation of the latter, such clamping screw being threaded in the web and bearing in said slot, and an adjustable screw having a fine thread engaging in the body-piece, said screw bearing against the rim of said gage-plate, to one side of its axis of rotation and operable to give the gage-plate very slight adjustment about its pivot.

2. In a tool of the character described, a body-piece comprising two lateral edge portions spaced apart and connected by an intermediate web, a gage-plate pivotally mounted on such web and provided with a slot, the pivot bearing in a slot of one of the parts thereby connected, whereby the gage-plate is permitted lineal as well as arcuate adjustment, a clamping screw for the gage-plate located at one side of the axis of rotation of the latter, such clamping screw being threaded in the other part and bearing in said slot, and an adjustable screw having a fine thread engaging in the body-piece, said screw bearing against the rim of said gage-plate, to one side of its axis of rotation and operable to give the gage-plate very slight adjustment about its pivot.

AUGUST H. BASTIAN.